United States Patent
Tanigawa et al.

(10) Patent No.: US 8,446,110 B2
(45) Date of Patent: May 21, 2013

(54) ILLUMINATION SYSTEM

(75) Inventors: Tetuya Tanigawa, Kobe (JP); Yuichi Ejiri, Hirakata (JP); Tosikazu Kawasima, Katano (JP)

(73) Assignee: Panasonic Corporation, Osaka (JP)

( * ) Notice: Subject to any disclaimer, the term of this patent is extended or adjusted under 35 U.S.C. 154(b) by 293 days.

(21) Appl. No.: 13/084,586

(22) Filed: Apr. 12, 2011

(65) Prior Publication Data

US 2011/0260654 A1 Oct. 27, 2011

(30) Foreign Application Priority Data

Apr. 21, 2010 (JP) ................................. 2010-098098

(51) Int. Cl.
*H05B 37/00* (2006.01)
(52) U.S. Cl.
USPC ......................................................... 315/312
(58) Field of Classification Search
USPC ................................................. 315/312, 313
See application file for complete search history.

(56) References Cited

U.S. PATENT DOCUMENTS

| 2010/0219761 A1* | 9/2010 | Damink et al. ............... 315/152 |
| 2010/0244746 A1* | 9/2010 | Van De Sluis et al. ....... 315/312 |

FOREIGN PATENT DOCUMENTS

| JP | 2010-055801 | | 3/2010 |
| WO | 2008/047281 | | 4/2008 |
| WO | WO2008047281 | * | 4/2008 |
| WO | 2009/010926 | | 1/2009 |
| WO | WO2009010926 | * | 1/2009 |
| WO | 2009/136309 | | 11/2009 |

OTHER PUBLICATIONS

The European Search Report dated Nov. 5, 2012.

* cited by examiner

*Primary Examiner* — Thienvu Tran
(74) *Attorney, Agent, or Firm* — Bacon & Thomas, PLLC

(57) ABSTRACT

An illumination system includes illumination devices, an imaging device and a control device. Each of the illumination devices includes a light source, a lighting circuit unit and a transmission control unit. The control device includes a storage unit, a transmission processing unit and a main control unit for selecting a control-target illumination area, reading out the identification code corresponding to the selected illumination area from the storage unit and causing the transmission processing unit to transmit a signal containing a control command on the illumination device. The main control unit is operable in an initial setting mode in which the correlations between the identification codes of the illumination devices and the illumination areas are set by causing the imaging device to take an image of the illumination space while turning on the illumination devices and detecting the illumination area of each of the illumination devices from the image thus taken.

5 Claims, 5 Drawing Sheets

FIG.3B

| ID NUMBER | X-COORDINATE | Y-COORDINATE |
|---|---|---|
| 01 | 80 | 240 |
| 02 | 240 | 400 |
| 03 | 560 | 80 |
| 04 | 240 | 240 |
| 05 | 80 | 80 |
| 06 | 560 | 400 |
| 07 | 80 | 400 |
| 08 | 240 | 80 |
| 09 | 560 | 240 |
| 10 | 400 | 80 |
| 11 | 400 | 400 |
| 12 | 400 | 240 |

ILLUMINATION SYSTEM

FIELD OF THE INVENTION

The present invention relates to an illumination system including a plurality of illumination devices and a control device for controlling the illumination devices.

BACKGROUND OF THE INVENTION

Conventionally, there has been provided an illumination system including a plurality of illumination devices respectively allotted with specific identification codes and a control device connected to the respective illumination devices through transmission lines. Depending on the time schedule, the switch operation, the sensor input or the like, the control device sends a transmission signal containing an identification code of the illumination device to be controlled and a control command. Only the illumination device allotted with an identification code coinciding with the identification code contained in the transmission signal receives the transmission signal. Control for turning on or off a light source or control for changing the dimming level of the light source is performed according to the control command contained in the transmission signal.

Further, there has been provided another conventional illumination system that causes an imaging device to take an image of a space (illumination space) illuminated by illumination devices, detects a moving object (e.g., a human body) from the image taken by the imaging device and controls the illumination devices to illuminate the illumination space when the moving object is detected (see, e.g., Japanese Patent Application Publication No. 2010-55801).

In case of using the aforementioned conventional illumination systems in combination, it is necessary that the correlations between the identification codes allotted to the illumination devices and the areas (illumination areas) illuminated by the illumination devices be set beforehand in the control device in order to illuminate the illumination area corresponding to a position where a person exists. For example, seals indicating the identification codes are attached to the respective illumination devices so that workers can grasp the identification codes of the illumination devices. The workers install the illumination devices based on the installation drawings showing the relationships between the identification codes and the installation places. Thereafter, the correlations between the identification codes of the illumination devices and the illumination areas are set in the control device using a remote controller or the like.

In the aforementioned conventional illumination systems, however, the task of setting the correlations between the identification codes allotted to the illumination respective devices and the areas (illumination areas) illuminated by the respective illumination devices in the control device is highly time-consuming and laborious.

SUMMARY OF THE INVENTION

In view of the above, the present invention provides an illumination system capable of simplifying the task of setting the correlations between identification codes of illumination devices and illumination areas in a control device.

In accordance with an aspect of the present invention, there is provided an illumination system, including: a plurality of illumination devices respectively allotted with specific identification codes; an imaging device for taking an image of an illumination space to be illuminated by the illumination devices; and a control device for controlling the illumination devices to illuminate the illumination space based on the image of the illumination space taken by the imaging device, wherein each of the illumination devices includes an light source, a lighting circuit unit for turning on or off the light source and a transmission control unit for performing data transmission between itself and the control device by using the corresponding identification code as its own address and for controlling the lighting circuit unit to turn on or off the light source according to a control command transmitted from the control device, wherein the control device includes a storage unit for storing correlations between the identification codes of the illumination devices and the illumination areas illuminated by the illumination devices, a transmission processing unit for transmitting a transmission signal containing the control command to the illumination devices by using the identification codes as destination addresses and a main control unit for selecting a control-target illumination area based on the image of the illumination space taken by the imaging device, reading out the identification code corresponding to the selected illumination area from the storage unit and causing the transmission processing unit to transmit a transmission signal containing a control command on the illumination device allotted with the read-out identification code by using the read-out identification code as a destination address, the main control unit being operable in an initial setting mode in which the correlations between the identification codes of the illumination devices and the illumination areas are set by causing the imaging device to take an image of the illumination space while turning on the illumination devices one after another and detecting the illumination area of each of the illumination devices from the image thus taken.

In the initial setting mode, the main control unit may detect the illumination area based on the position in the image of a pixel having a pixel value equal to or greater than a threshold value.

In the initial setting mode, the main control unit may use the position of a pixel having a highest pixel value as the position of the illumination area.

In the initial setting mode, the main control unit may find a difference image between a reference image taken by the imaging device with all the illumination devices kept turned off and a comparative image taken by the imaging device with each of the illumination devices independently turned on, and correlates each of the illumination areas with the identification code of each of the illumination devices by using the position in the difference image of pixels having pixel values equal to or greater than a threshold value as the illumination area.

In the initial setting mode, the main control unit may find a difference image between a reference image taken by the imaging device with all the illumination devices kept turned off and a comparative image taken by the imaging device with each of the illumination devices independently turned on, and correlates each of the illumination areas with the identification code of each of the illumination devices by using the position in the difference image of a pixel having a highest pixel value as the position of the illumination area.

The illumination system of the present invention has an advantageous effect in that it is possible to simplify the task of setting the correlations between identification codes of illumination devices and illumination areas in a control device.

BRIEF DESCRIPTION OF THE DRAWINGS

The objects and features of the present invention will become apparent from the following description of embodiments, given in conjunction with the accompanying drawings, in which:

FIGS. 3A and 3B are views for explaining the correlations between identification codes and illumination areas in the illumination system;

DETAILED DESCRIPTION OF THE PREFERRED EMBODIMENTS

Figure 1:
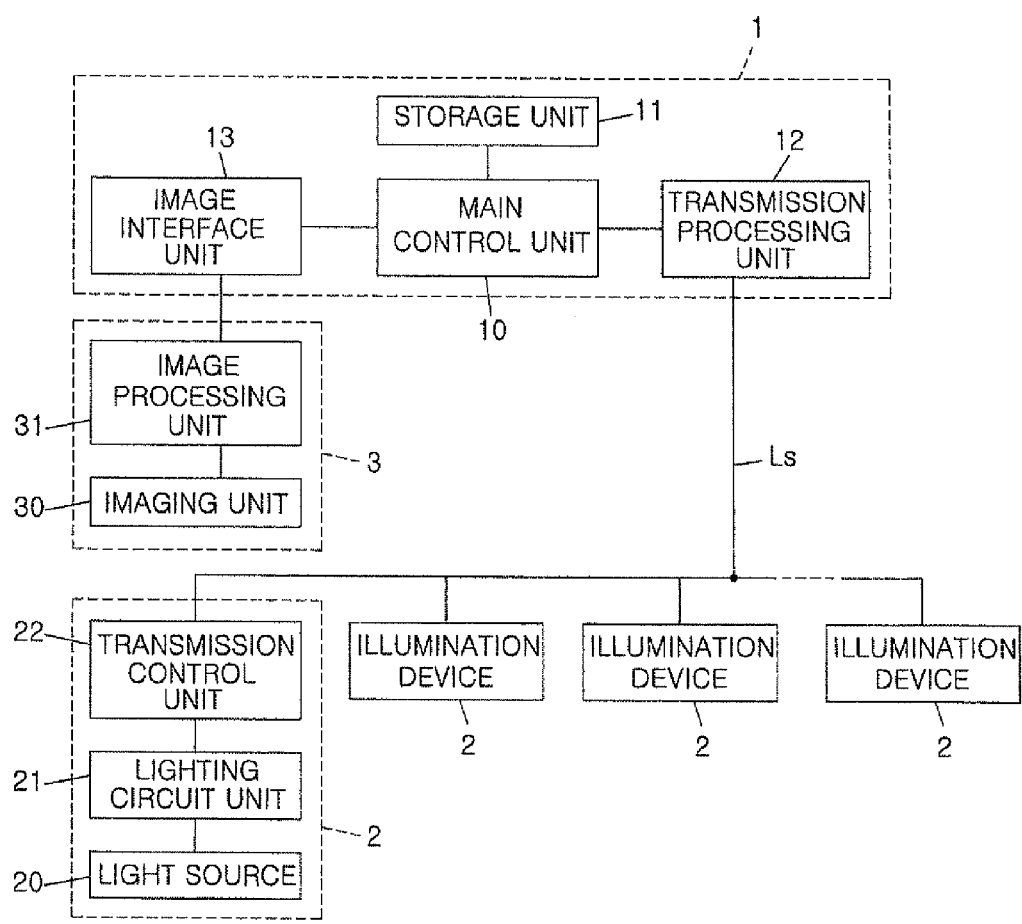
FIG. 1 is a system configuration view showing an illumination system according to one embodiment of the present invention.

Referring to FIG. 1, an illumination system in accordance with an embodiment of the present invention includes a plurality of illumination devices 2 allotted with specific identification codes (e.g., ID numbers), an imaging device 3 for taking an image of an illumination space A illuminated by the illumination devices 2 and a control device 1 for, based on the image of the illumination space A taken by the imaging device 3, controlling the illumination devices 2 to illuminate the illumination space A.

Figure 2:
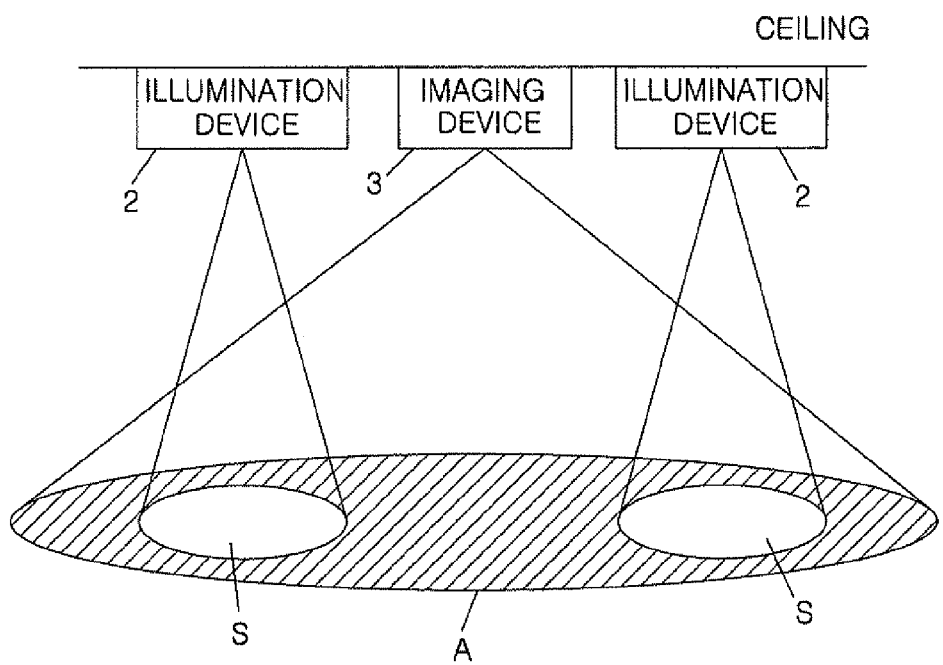
FIG. 2 is a view for explaining an illumination space and an illumination area in the illumination system.

Each of the illumination devices 2 includes a light source 20 such as an incandescent lamp, a fluorescent lamp or a light-emitting diode, a lighting circuit unit 21 for turning on/off the light source 20 and a transmission control unit 22 for controlling the lighting circuit unit 21. The transmission control unit 22 performs data transmission between itself and the control device 1 by using the corresponding identification code as its own address and, responsive to a control command transmitted from the control device 1, controls the lighting circuit unit 21 to turn on, turn off or dim the light source 20. As shown in FIG. 2, the illumination devices 2 are arranged side by side in the ceiling of the illumination space A (e.g., a working room of an office) to illuminate individual areas (illumination areas S) of the illumination space A.

The imaging device 3 includes an imaging unit 30, which has an imaging element such as a CCD image sensor or a CMOS image sensor and a lens (wide-angle lens), and an image processing unit 31 for, responsive to an instruction from the control device 1, converting the image taken by the imaging unit 30 to digital image data and outputting them to the control device 1. The image processing unit 31 serves to convert analog image signals outputted from the imaging unit 30 to image data indicating the pixel positions and pixel values (e.g., pixel values of 256 stages ranging from 0 to 255) of the image. The imaging device 3 is installed in the ceiling so that the illumination space A can fall within the angle of view of the imaging unit 30 as shown in FIG. 2.

The control device 1 includes a main control unit 10, a storage unit 11, a transmission processing unit 12 and an image interface unit 13. The image interface unit 13 receives the image data outputted from the image processing unit 31 of the imaging device 3 and delivers the image data to the main control unit 10. The instruction (command) to be supplied from the main control unit 10 to the imaging device 3 is outputted to the image processing unit 31 through the image interface unit 13. The storage unit 11 is formed of an electrically-rewritable non-volatile semiconductor memory such as a flash memory or the like. The storage unit 11 stores the image data received from the imaging device 3 and the correlations between the below-mentioned ID numbers i (i=1, 2, ..., n) and the illumination areas S (hereinafter just referred to as "correlations").

Using the image of the illumination space A taken by the imaging device 3, the main control unit 10 selects a control-target illumination area S and reads out the ID number i corresponding to the selected illumination area S from the storage unit 11. The main control unit 10 sets the read-out ID number i as a destination address and generates a frame containing a control command about the illumination device 2 allotted with the ID number i. The transmission processing unit 12 generates a transmission signal by encoding and modulating the frame received from the main control unit 10 and transmits the transmission signal to the illumination device 2 through a transmission line Ls. The transmission signal transmitted through the transmission line Ls is received by the transmission control unit 22 of each of the illumination devices 2. The transmission control unit 22 acquires the original frame by demodulating and decoding the received transmission signal. If the ID number i set as the destination address of the frame coincides with its own ID number, the transmission control unit 22 controls the lighting circuit unit 21 according to the control command contained in the frame. If the ID number i of the destination address of the received frame does not coincide with its own ID number, the transmission control unit 22 discards the frame and does not control the lighting circuit unit 21.

Figure 3A:
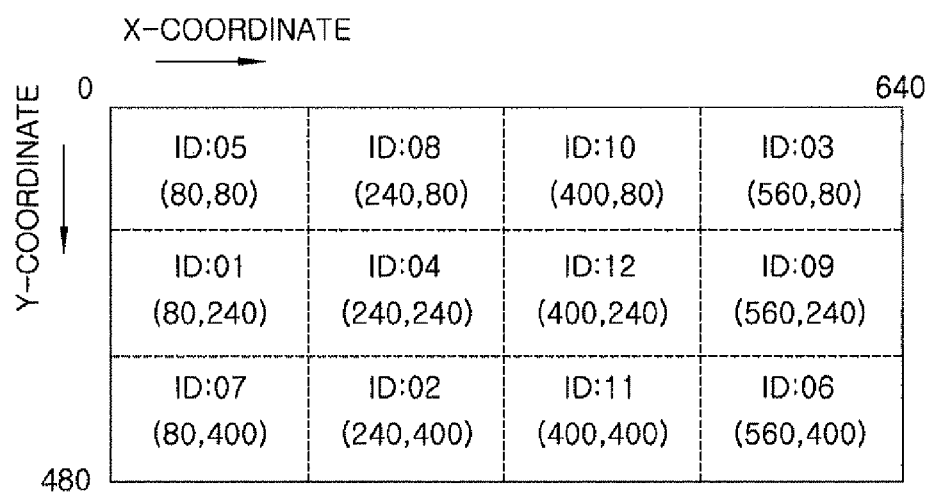

Description will now be made on the correlations stored in the storage unit 11 of the control device 1. FIG. 3A shows an image obtained by photographing the entire illumination space A with the imaging device 3. Supposing a two-dimensional rectangular coordinate system for the image, the positions of individual pixels can be represented by coordinates $(x_k, y_m)$. Since the number of pixels is 640 in the horizontal direction and 480 in the vertical direction, k is equal to 1, 2, ..., 640 and m is equal to 1, 2, ..., 480.

For example, if twelve illumination devices 2 are arranged three lengthwise and four crosswise, the center coordinates of the illumination areas S of the respective illumination devices 2 are represented by twelve coordinates (80, 80), (240, 80), (400, 80), (560, 80), (80, 240), (240, 240), (400, 240), (560, 240), (80, 400), (240, 400), (400, 400) and (560, 400). As shown in FIG. 3B, the correlations between the center coordinates of the respective illumination areas S and the ID numbers i of the illumination devices 2 illuminating the respective illumination areas S are stored in the storage unit 11. In the illustrated example, the center coordinates of the illumination area S of the illumination device 2 with ID number 1 (01) are (80, 240), the center coordinates of the illumination area S of the illumination device 2 with ID number 2 (02) are (240, 400), and the center coordinates of the illumination area S of the illumination device 2 with ID number 3 (03) are (560, 80).

Next, description will be made on the control operation of the control device 1 employed in the present embodiment. The main control unit 10 of the control device 1 causes the storage unit 11 to store an image (reference image) obtained by photographing the illumination space A with the imaging device 3 in a state that no person exists in the illumination space A and then finds a difference image between the reference image and the fresh image periodically taken by the imaging device 3. It can be presumed that the image areas representing images of furniture such as desks or chairs or office automation equipment such as computers or copiers are excluded from the difference image and only the image area representing an object absent in the reference image, namely, a person newly moved into the illumination space A, is left in the difference image. The main control unit 10 detects the existence and position (coordinates) of a person from the difference image, finds the center coordinates closest to the detected position (coordinates) of the person among the twelve center coordinates of the illumination areas S by referring to the correlations stored in the storage unit 11, and then reads out the ID number i corresponding to the center coordinates thus found. For example, if the detected position of a person is assumed to be (400, 300), the center coordinates closest thereto are (400, 240). Thus, ID number corresponding to the center coordinates (400, 240) is read out by the main control unit 10.

The main control unit 10 generates a frame containing a light-on control command and carrying the read-out ID number (e.g., ID number 12) as a destination address. The frame as a transmission signal is transmitted from the transmission processing unit 12 through the transmission line Ls. In the illumination device 2 of ID number 12, the destination address of the transmission signal received by the transmission control unit 22 coincides with its own ID number. Therefore, the transmission control unit 22 controls the lighting circuit unit 21 to turn on the light source 20 according to the control command obtained by decoding the received transmission signal. On the other hand, the transmission control units 22 of the illumination devices 2 other than the illumination device 2 of ID number 12 discard the frame and do not control the lighting circuit units 21 even if they receive the transmission signal transmitted from the control device 1. This is because the ID number of the destination address does not coincide with the ID numbers of the other illumination devices 2. Consequently, only the position of the illumination space A where a person exists is illuminated by one of the illumination devices 2.

The operation of the control device 1 is not limited to the operation of detecting the position of a person from the image taken by the imaging device 3 and controlling the illumination devices 2 in the afore-mentioned manner. For example, the main control unit 10 may detect the area illuminated by ambient light (sunlight) passing through a window around the illumination space A and may perform control to turn off, or reduce the dimming level of, the illumination device 2 whose illumination area S covers the area illuminated by the ambient light (sunlight). As a method of detecting the illumination area of ambient light with the main control unit 10, it is thinkable that the image taken when no ambient light exists is used as a reference image and the illumination area of ambient light is detected from a difference image between the reference image and the image taken when ambient light exists.

Figure 4:
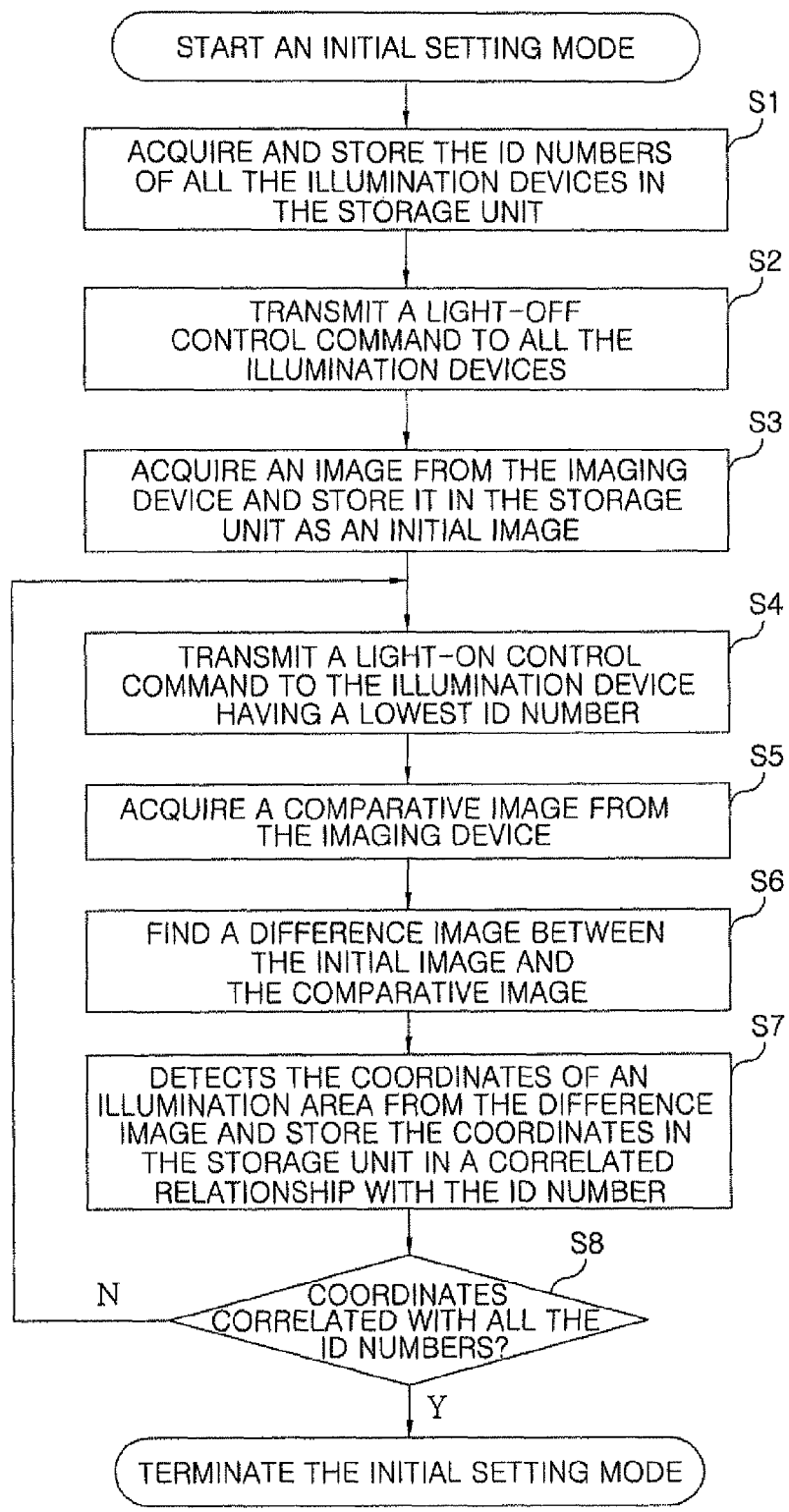
FIG. 4 is a flowchart for explaining the operations of an initial setting mode in the illumination system.

Next, a method of setting the correlations between the ID numbers and the illumination areas S of the illumination devices 2, one of major features of the present invention, will be described with reference to a flowchart shown in FIG. 4.

When started up, the main control unit 10 of the control device 1 searches the storage unit 11. If the correlations between the ID numbers and the illumination areas S of the illumination devices 2 are not stored in the storage unit 11, the main control unit 10 proceeds to an operation mode for setting the correlations (an initial setting mode).

In the initial setting mode, the main control unit 10 acquires the ID numbers of all the illumination devices 2 connected through the transmission line Ls and stores the ID numbers in the storage unit 11 (step S1). The ID numbers can be acquired by, e.g., a method in which the main control unit 10 generates a frame containing a control command requesting the illumination devices 2 to make a reply on the ID number and broadcasts a transmission signal, which is obtained by encoding and modulating the frame, from the transmission processing unit 12 to the illumination devices 2. The transmission control units 22 of all the illumination devices 2 receiving the broadcast transmission signal send back to the control device 1 transmission signals obtained by encoding and modulating frames containing their own ID numbers. As a result, the main control unit 10 of the control device 1 can acquire the ID numbers of all the illumination devices 2.

The main control unit 10 generates a frame containing a light-off control command and broadcasts the frame from the transmission processing unit 12 to all the illumination devices 2 (step S2). Subsequently, the main control unit 10 instructs the imaging device 3 to take an image through the image interface unit 13. The image of the illumination space A, in which all the illumination devices 2 are kept turned off, is taken by the imaging device 3 and sent to the main control unit 10 of the control device 1. The main control unit 10 causes the storage unit 11 to store the image (initial image) received from the imaging device 3 (step S3).

Figure 5:
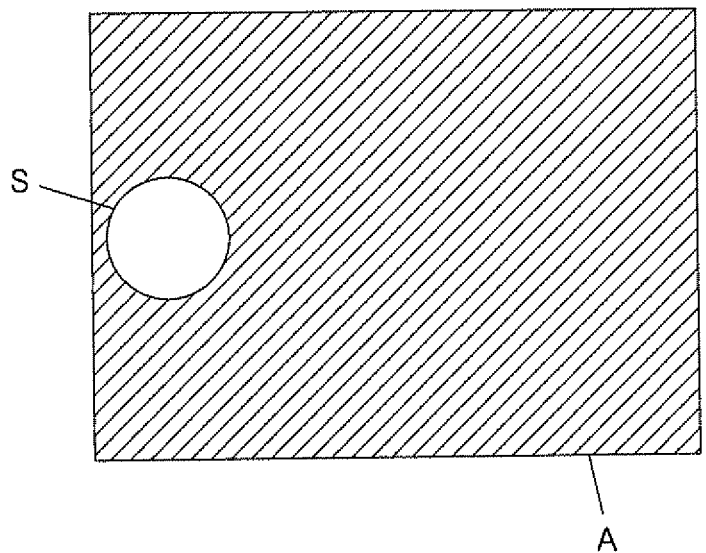
FIG. 5 is a view for explaining the operations of an initial setting mode in the illumination system.

The main control unit 10 generates a frame containing a light-on control command and carrying the lowest one of the ID numbers (e.g., ID number 1) stored in the storage unit 11 as a destination address. The frame is encoded and modulated into a transmission signal by the transmission processing unit 12. The transmission signal is transmitted to the illumination device 2 having the destination address through the transmission line Ls (step S4). Only the illumination device 2 receiving the transmission signal turns on the light source 20 to illuminate the illumination area S (see FIG. 5). In this state, the main control unit 10 instructs the imaging device 3 to take an image through the image interface unit 13. The image of the illumination space A, in which only one of the illumination devices 2 is turned on, is taken by the imaging device 3 and sent to the main control unit 10 of the control device 1. The main control unit 10 causes the storage unit 11 to store the image (comparative image) received from the imaging device 3 (step S5).

Subsequently, the main control unit 10 finds a difference image between the initial image and the comparative image (step S6), detects the position of a pixel having a highest pixel value in the difference image and stores the detected position in the storage unit 11 as the position of the illumination area S corresponding to the ID number (step S7). Even in the initial image available when all the illumination devices 2 are turned off, the pixel values of all the pixels do not necessarily become zero due to the influence of a light noise. Therefore, instead of detecting the highest pixel value of the difference image, it may be possible to set a threshold value not affected by the light noise, to detect pixels having pixel values equal to or greater than the threshold value and to use the position (coordinates) of the central one of the detected pixels as the illumination area S. The threshold value may be set equal to a pixel value available when the luminous intensity of a bottom surface is about 100 lux.

The main control unit 10 performs the processing of steps S4 through S7 with respect to all the ID numbers and terminates the initial setting mode if the coordinates of the illumination areas S are completely correlated with the ID numbers (step S8).

With the illumination system described above, the correlations between the ID numbers of the illumination devices 2 and the illumination areas S are initially set using the image taken by the imaging device 3. As compared with the conventional illumination systems, therefore, it is possible to simplify the task of setting the correlations between the ID numbers of the illumination devices 2 and the illumination areas S in the control device 1. In the initial setting mode, other devices than the control device 1, the illumination devices 2 and the imaging device 3 are unnecessary, which eliminates the need to prepare other devices for the initial setting purpose. This also makes it possible to simplify the setting task. While the illumination devices 2 are turned off in the initial setting mode in the present embodiment, the illumination devices 2 are not necessarily turned off but may be turned on with a dimming level of, e.g., about several ten percents.

While the invention has been shown and described with respect to the embodiments, it will be understood by those skilled in the art that various changes and modification may be made without departing from the scope of the invention as defined in the following claims.

What is claimed is:

1. An illumination system, comprising:
a plurality of illumination devices respectively allotted with specific identification codes;
an imaging device for taking an image of an illumination space to be illuminated by the illumination devices; and
a control device for controlling the illumination devices to illuminate the illumination space based on the image of the illumination space taken by the imaging device,
wherein each of the illumination devices includes an light source, a lighting circuit unit for turning on or off the light source and a transmission control unit for performing data transmission between itself and the control device by using the corresponding identification code as its own address and for controlling the lighting circuit unit to turn on or off the light source according to a control command transmitted from the control device,
wherein the control device includes a storage unit for storing correlations between the identification codes of the illumination devices and the illumination areas illuminated by the illumination devices, a transmission processing unit for transmitting a transmission signal containing the control command to the illumination devices by using the identification codes as destination addresses and a main control unit for selecting a control-target illumination area based on the image of the illumination space taken by the imaging device, reading out the identification code corresponding to the selected illumination area from the storage unit and causing the transmission processing unit to transmit a transmission signal containing a control command on the illumination device allotted with the read-out identification code by using the read-out identification code as a destination address, the main control unit being operable in an initial setting mode in which the correlations between the identification codes of the illumination devices and the illumination areas are set by causing the imaging device to take an image of the illumination space while turning on the illumination devices one after another and detecting the illumination area of each of the illumination devices from the image thus taken.

2. The illumination system of claim 1, wherein, in the initial setting mode, the main control unit detects the illumination area based on the position in the image of a pixel having a pixel value equal to or greater than a threshold value.

3. The illumination system of claim 1, wherein, in the initial setting mode, the main control unit uses the position of a pixel having a highest pixel value as the position of the illumination area.

4. The illumination system of claim 1, wherein, in the initial setting mode, the main control unit finds a difference image between a reference image taken by the imaging device with all the illumination devices kept turned off and a comparative image taken by the imaging device with each of the illumination devices independently turned on, and correlates each of the illumination areas with the identification code of each of the illumination devices by using the position in the difference image of pixels having pixel values equal to or greater than a threshold value as the illumination area.

5. The illumination system of claim 1, wherein, in the initial setting mode, the main control unit finds a difference image between a reference image taken by the imaging device with all the illumination devices kept turned off and a comparative image taken by the imaging device with each of the illumination devices independently turned on, and correlates each of the illumination areas with the identification code of each of the illumination devices by using the position in the difference image of a pixel having a highest pixel value as the position of the illumination area.

* * * * *